(12) United States Patent
Kao (10) Patent No.: US 10,440,118 B2
(45) Date of Patent: Oct. 8, 2019

(54) SCALABLE HOMOGENIZED INTELLIGENT BUILDING DATA INGEST CONTROLLER

(71) Applicant: AT&T Intellectual Property I, L.P., Atlanta, GA (US)

(72) Inventor: Frank Kao, Palo Alto, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 476 days.

(21) Appl. No.: 14/626,708

(22) Filed: Feb. 19, 2015

(65) Prior Publication Data
US 2016/0248856 A1    Aug. 25, 2016

(51) Int. Cl.
*H04L 29/08*    (2006.01)
*H04L 12/28*    (2006.01)
*G06F 16/00*    (2019.01)

(52) U.S. Cl.
CPC .............. *H04L 67/12* (2013.01); *G06F 16/00* (2019.01); *H04L 12/2836* (2013.01); *H04L 67/1097* (2013.01); *H04L 67/2823* (2013.01)

(58) Field of Classification Search
None
See application file for complete search history.

(56) References Cited

U.S. PATENT DOCUMENTS

| | | | |
|---|---|---|---|
| 4,259,548 A | 3/1981 | Fahey et al. | |
| 4,284,849 A | 8/1981 | Anderson et al. | |
| 5,216,623 A | 6/1993 | Barrett et al. | |
| 6,782,351 B2 * | 8/2004 | Reichel | G01N 33/0075 340/501 |
| 7,016,742 B2 | 3/2006 | Jarrell et al. | |

(Continued)

FOREIGN PATENT DOCUMENTS

WO    WO 2014066429 A1    5/2014

OTHER PUBLICATIONS

Roggen, Daniel, et al. "Collecting complex activity datasets in highly rich networked sensor environments." Networked Sensing Systems (INSS), 2010 Seventh International Conference on. IEEE, 2010. http://infoscience.epfl.ch/record/148362/files/RoggenCaRoHoFTrLuBa10.pdf. Discloses synchronizing data from heterogenous sensor networks (Section IV.B. on the 5th page).

(Continued)

*Primary Examiner* — Reema Patel
*Assistant Examiner* — Steven M Christopher (57) ABSTRACT

A device for processing alarms includes a processor and a computer-readable medium storing instructions which, when executed by the processor, cause the processor to perform operations for processing building management system data. The operations include retrieving a first source driver and a first destination driver. The first source driver is for accessing the building management system data from a first source and the first destination driver is for transforming the data from the first source into a first standard format utilized by a first destination data storage system. The operations further include accessing the data from the first source using the first source driver, transforming the data from the first source into the first standard format using the first destination driver, and storing the data from the first source that is transformed into the first standard format into the first destination data storage system.

20 Claims, 5 Drawing Sheets

(56) References Cited

U.S. PATENT DOCUMENTS

| | | | |
|---|---|---|---|
| 7,746,794 B2 | 6/2010 | Sink | |
| 8,223,744 B2 | 7/2012 | Goldberg et al. | |
| 8,290,630 B2 | 10/2012 | Lakomiak et al. | |
| 8,321,194 B2 | 11/2012 | Meagher et al. | |
| 8,390,474 B2 | 3/2013 | Yi et al. | |
| 8,421,630 B2 | 4/2013 | Butler et al. | |
| 8,494,686 B2 | 7/2013 | Masters et al. | |
| 8,558,699 B2 | 10/2013 | Butler et al. | |
| 8,577,711 B2 | 11/2013 | Korecki et al. | |
| 8,620,841 B1 | 12/2013 | Filson et al. | |
| 8,836,503 B2 | 9/2014 | Gelvin et al. | |
| 8,855,825 B2 | 10/2014 | Grohman | |
| 8,862,393 B2 | 10/2014 | Zhou et al. | |
| 2008/0256445 A1 | 10/2008 | Olch et al. | |
| 2010/0145164 A1 | 6/2010 | Howell | |
| 2011/0304475 A1 | 12/2011 | Higgins et al. | |
| 2012/0197852 A1 | 8/2012 | Dutta et al. | |
| 2012/0197856 A1 | 8/2012 | Banka et al. | |
| 2012/0303388 A1 | 11/2012 | Vishnubhatla et al. | |
| 2013/0339403 A1* | 12/2013 | Chao | G06F 17/5009 707/821 |
| 2014/0129866 A1 | 5/2014 | Hallman et al. | |

OTHER PUBLICATIONS

Manjeshwar, Arati, and Dharma P. Agrawal. "Teen: a routing protocol for enhanced efficiency in wireless sensor networks." Parallel and Distributed Processing Symposium, International. vol. 3. IEEE Computer Society, 2001. http://140.136.149.173/jwl/TeachingActivities/Sensor_Networks/slides/TEEN%20%20A%20Routing%20Protocol%20for%20Enhanced%20Efficiency%20in%20Wireless%20Sensor%20Networks.pdf Discloses aggregating data from proximate nodes and sending to collection point (3 on the 1st Page; Figure 1).

Porter, John H., Paul C. Hanson, and Chau Chin Lin. "Staying afloat in the sensor data deluge." Trends in ecology & evolution 27.2 (2012): 121129. http://www.planta.cn/forum/files_planta/05_staying_afloat_in_the_sensor_data_deluge_576.pdf Disclosing standardizing data from heterogeneous sensor networks (Table1 on p. 123; pp. 124-125).

Dietrich, Isabel, and Falko Dressler. "On the lifetime of wireless sensor networks." ACM Transactions on Sensor Networks (TOSN) 5.1 (2009): 5. http://www.ccslabs. org/bib/dietrich2009lifetime/dietrich2009lifetime.pdf Disclosing that nodes become heterogeneous in because the requirements have to be fulfilled by each type of sensor (aggregating on p. 6 before normalizing the results on pp. 30-32).

Marinelli, Eugene E. "Hyrax: cloud computing on mobile devices using MapReduce." No. CMUCS09164. Carnegiemellon Univ Pittsburgh PA School of Computer Science, 2009. http://www.dtic.mil/cgibin/GetTRDoc?AD=ADA512601&%3BLocation=U2&%3Bdoc=GetTRDoc.pdf&origin=publication_detail. Disclosing cloud based sensor networks using Hadoop alternatives and database logic (pp. 89-96).

De, Debraj, and Lifeng Sang. "QoS supported efficient clustered query processing in large collaboration of heterogeneous sensor networks." Collaborative Technologies and Systems, 2009. CTS'09. International Symposium on. IEEE, 2009. http://sensorweb.cs.gsu.edu/~dej/docs/cts09.pdf Discloses normalizing sensor data into common form to minimize energy for standard queries (p. 245).

* cited by examiner

SCALABLE HOMOGENIZED INTELLIGENT BUILDING DATA INGEST CONTROLLER

BACKGROUND

A building management system (BMS) may monitor one or more different physical parameters relating to a building environment, including for example: temperature, humidity, atmospheric pressure, light level, sound level, and so forth. A BMS may include a number of sensors throughout a room, a building, or a group of several buildings. The sensors may also be connected to and managed by an aggregation panel that receives data generated by the sensors. There are numerous building management systems of different vendors and with different data formats. In addition, with increasing usage of networked devices and the Internet-of-things, more data is generated with new device types, which may also have new and different data formats. Sensor data is typically stored in tables in a proprietary format at each vendor's aggregation panel or other data aggregation device. To aggregate sensor data, the customary procedure is to simply access each vendor's data aggregation device, copy the data and store the data elsewhere, e.g., in a centralized location with data from other sources and in different formats.

SUMMARY

In one embodiment, the present disclosure provides a device, computer-readable medium, and method for processing building management system data. For example, a device includes a processor and a computer-readable medium storing instructions which, when executed by the processor, cause the processor to perform operations. In one example, the operations include retrieving a first source driver and a first destination driver. The first source driver is for accessing the building management system data from a first source and the first destination driver is for transforming the building management system data from the first source into a first standard format utilized by a first destination data storage system. In one example, the operations further include accessing the building management system data from the first source using the first source driver, transforming the building management system data from the first source into the first standard format using the first destination driver, and storing the building management system data from the first source that is transformed into the first standard format into the first destination data storage system.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

The present disclosure relates to an ingest controller for aggregating building management system (BMS) data from various sensors and various sources at different locations, where the BMS data may be in different formats specific to each sensor vendor. It should be noted that throughout the present disclosure the terms, BMS data and sensor data may be used interchangeably. Sensor data may relate to temperature, humidity, atmospheric pressure, sound level, noise level, air quality, and so forth. Each room, floor, building or other area may have at least one data pipe that terminates at an aggregation panel, where each aggregation panel aggregates sensor data of a first vendor type. Thus, for example, if a building has different sensors from different vendors, there may be more than one data pipe and more than one aggregation panel, e.g., one for each vendor.

In one embodiment, the present disclosure is an ingest controller that is situated between the aggregation panels of the different buildings and a destination data storage system, e.g., a mass-storage platform, which may be informally referred to as a "big data lake." In accordance with the present disclosure, the sensor data from different vendors systems may be transformed into a standard format and stored in the destination data storage system. In one example, the destination data storage system may also be cloud-based, e.g., a Hadoop® distributed file system (HDFS). In one embodiment, each vendor provides a "source" driver for its respective system to allow the ingest controller to access and retrieve the sensor data from the aggregation panel (or from a regional aggregator, as described in greater detail below). This allows each vendor to specify how data will be accessed on its system and to thereby retain control over its products, while allowing the ingest controller to access the required sensor data. For example, the source driver may specify that sensor data should be accessed from components of the vendor's system via file exchange, database queries/remote queries, web service calls, etc.

In one example, the vendor is also required to provide a "destination" driver such that the sensor data that is retrieved is transformed into a preferred format for the destination data storage system, e.g., the "big data lake." Thus, execution of the source driver and destination driver by the ingest controller will result in accessing the sensor data in its native format from the vendor's system, retrieving the sensor data, manipulating the sensor data into a preferred standard format, and storing the sensor data to the destination data storage system. The preferred format can be different for different destination data storage systems. Thus, each destination data storage system can have a "published public schema" that specifies the preferred, or "standard" format into which the sensor data should be transformed. The source and destination drivers are then provided to the operator of the ingest controller. The ingest controller can then run the drivers to access data from the vendors' systems according to the preferences of each vendor and to properly transform the sensor data into the standard format of the particular destination data storage system prior to storage.

Figure 1:
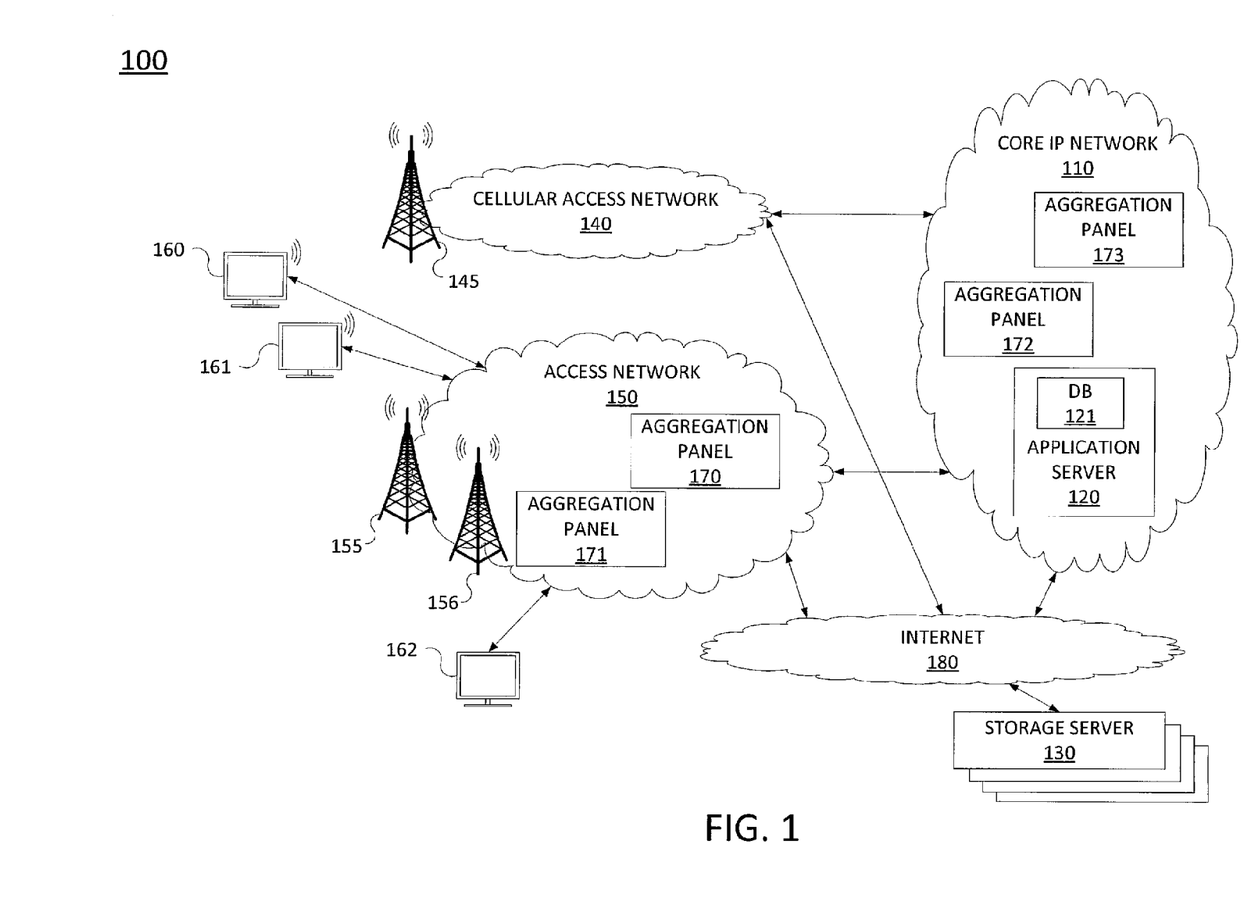
FIG. 1 illustrates an exemplary network related to the present disclosure.

To aid in understanding the present disclosure, FIG. 1 illustrates in greater detail an exemplary system 100 that is suitable for use in connection with processing building management system data, according to the present disclosure. Although the present disclosure is discussed below in the context of a particular system or network architecture, the present disclosure is not so limited. Namely, the present disclosure can be applied to any type of communication network that is capable of transmitting data, such as a local area network (LAN), a wireless local area network (WLAN), an Internet Protocol (IP) network, such as an Internet Protocol/Multi-Protocol Label Switching (IP/MPLS) core network, an IP Multimedia Subsystem (IMS) network, communications over the Internet in general, and so forth.

As shown in FIG. 1, the system 100 connects sensor devices 160-162, aggregation panels 170-172, application server(s) 120 (e.g., one or more ingest controllers) and storage server(s) 130 (e.g., one or more destination data storage systems) via a core Internet Protocol (IP) network 110, a cellular access network 140, an access network 150 and/or Internet 180. In one embodiment, cellular access network 140 may comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, cellular access network 140 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of cellular access network, in the illustrative embodiment, cellular access network 140 is shown as a UMTS terrestrial radio access network (UTRAN) subsystem. Thus, element 145 may comprise a Node B or evolved Node B (eNodeB).

In one embodiment, access network 150 may comprise a non-cellular access network such as a wireless local area network (WLAN), an IEEE 802.11 network, a "wired" access network, e.g., a local area network (LAN), such as an Ethernet network, an enterprise network, a metropolitan area network (MAN), a digital subscriber line (DSL) network, a cable network, a hybrid network utilizing a plurality of such technologies, and so forth. Thus, in one example access network 150 may include at least one wireless communication point 155, which may comprise a wireless access point/wireless router, an IEEE 802.11 access point, a ZigBee access point, a Bluetooth Low Energy (BLE) beacon, and so forth. In one example, access network 150 may comprise a local network of a residence or business, e.g., an office building, a school, a hospital, a corporate or educational campus comprising multiple buildings, and the like. In one example, access network 150 may include multiple wireless communication points 155 of different types.

In one embodiment, core IP network 110 comprises a telecommunication service provider network with network devices or elements (not shown) which are capable of routing and forwarding IP packets between different hosts over the network. However, in one embodiment, the components of core IP network 110 may have additional functions, e.g., for functioning as a public land mobile network (PLMN)-General Packet Radio Service (GPRS) core network, for providing Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that although core IP network 110 is described as an Internet Protocol network, this does not imply that the functions are limited to IP functions, or that the functions are limited to any particular network layer.

As illustrated in FIG. 1, core IP network 110 includes one or more application servers, e.g., AS 120, for processing building management system data. In this regard, the application servers 120 may also include one or more databases (DB) 121 for storing instructions and other information relating to processing building management system data, in accordance with the present disclosure. Thus, in one example, each AS 120 may comprise any hardware server or computer that is well known in the art, and each database 121 may be any type of electronic collection of data that is also well known in the art. In one example, an AS 120 may take the form of device 500 illustrated in FIG. 5 and described in greater detail below. In one example, each AS 120 may represent an ingest controller, in accordance with the present disclosure.

As illustrated in FIG. 1, sensors 160-162 may have one or more wired or wireless connections to access networks 140 and 150. For example, sensors 160 and 161 may communicate wirelessly via element 145 of cellular access network 140 or via wireless communication points 155 and 156 of access network 150. Thus, each of the sensors 160-162 may have either or both of cellular and non-cellular access capabilities, and may alternatively or additionally have wired communication/networking capabilities. In addition, sensors 160 and 161 may monitor the same or different physical parameters as sensor 162, but may utilize a different data format.

As illustrated in FIG. 1, access network 150 and core IP network 110 include aggregation panels 170-173 for aggregating sensor data from sensors 160-162. In one example access network 150 may comprise one or more proprietary networks interconnecting one or more of sensors 160-162 with one or more of aggregation panels 170-171. For example, sensors 160 and 161 may be devices provided by a first vendor and may be configured to be managed by aggregation panel 170, while sensor 162 may be provided by a second vendor and may be configured to be managed by aggregation panel 171. Core IP network 110 may also include aggregation panels 172 and 173 for managing any one or more of sensors 160-162 that may communicate via cellular access network 140. For instance, aggregation panel 172 may manage sensors of a first vendor type and aggregation panel 173 may manage sensors of a second vendor type.

Each of aggregation panels 170-173 may communicate with the one or more application servers 120 for providing sensor data in response to queries/call from one of application servers 120, e.g., one or more ingest controllers. In turn, application servers 120 may communicate with data storage device(s) 130, e.g., one or more destination data storage systems, which may comprise one or more servers to store sensor data in a standard format, as described in greater detail in connection with FIGS. 2-4.

The above network 100 is described to provide an illustrative environment in which embodiments of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure, for conveying communications among devices, e.g., sensors, aggregation panels, ingest controllers, storage servers, core network components, access network components, and so forth. In particular, embodiments of the present disclosure may be implemented in any wired or wireless communication environment and may implement any communication technologies and protocols that enable devices to communicate, including: a cellular network, a wired and/or wireless local area network, a wide-area network, a wireless short-range peer-to-peer or mesh network, a satellite-based communication network, and internet service provider access network, a layer 3 transport network, a combination of one or more of the foregoing network types, and so forth. Thus, those skilled in the art will realize that the communication system 100 may be expanded by including additional endpoint devices, access networks, network elements, application servers, etc., or modifying or substituting those illustrated in FIG. 1, without altering the scope of the present disclosure.

Moreover, although a single cellular access network 140, a single access network 150, a single core IP network 110 and a limited number of sensors and aggregation panels are illustrated in FIG. 1, the present disclosure is not so limited. Thus, in other examples, the network 100 may include numerous additional sensors and other devices, additional access networks, and so forth. In addition, while the one or more application servers 120 are illustrated as components of core IP network 110 in FIG. 1 and while storage server(s) 130 are illustrated as being accessible via the Internet 180, this particular configuration of network 100 is provided for illustrative purposes only. In other words, in other, further and different embodiments, application server(s) 120, storage server(s) 130 and any other components and devices of network 100 may be alternatively deployed. Thus, these and other variations are all contemplated within the scope of the present disclosure.

Figure 2:
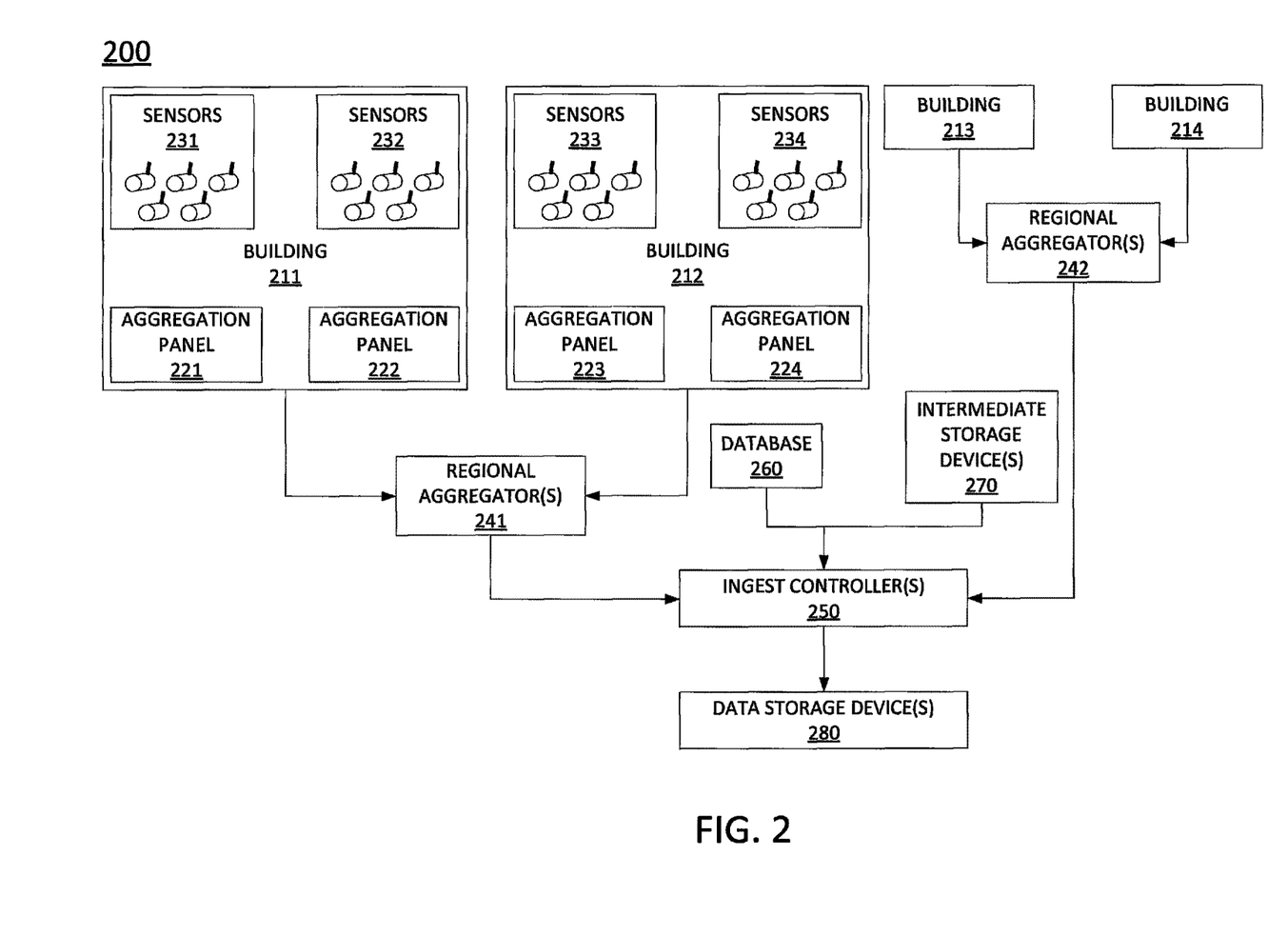
FIG. 2 illustrates a system with a building management system ingest controller, according to one example of the present disclosure.

To further aid in understanding the present disclosure, FIG. 2 illustrates an exemplary network or system 200 of the present disclosure for processing building management system data. Any of the devices and components illustrated in FIG. 2 may send and receive sensor data and other information via multiple communication modalities. Thus, in some cases, the communications may occur entirely within a local network, or may traverse one or more service provider networks/public networks, e.g., any one or more of the networks illustrated in FIG. 1.

System 200 includes multiple groups of sensors, e.g., sensor groups 231-234, and aggregation panels 221-224 situated in buildings 211-214. For ease of illustration, sensors and aggregation panels of buildings 213 and 214 are omitted from FIG. 2. As mentioned above, different sensors and aggregation panels may be provided by different vendors and utilize different data formats. Thus, a single building, e.g., building 211 may include multiple sensors groups and multiple aggregation panels. However, in one embodiment, a group of buildings may share an aggregation panel for sensor groups of a same vendor type, e.g., buildings 211 and 212 may be on a single corporate, medical, governmental or educational campus.

In addition to aggregation panels 221-224, system 200 may also include one or more regional aggregators 241-242. For instance Siemens® currently offers an InfoCenter® suite for managing sensor data of Siemens' products that may be located at a single site or situated throughout multiple locations. Other vendors may also offer similar products that may be incorporated into system 200 as one or more of regional aggregators 241-242.

System 200 may further include one or more ingest controllers 250, a database 260, e.g., stored on a server, and one or more intermediate storage devices 270. Notably, an ingest controller of the present disclosure may be configured to retrieve BMS data/sensor data from any of the sensors in sensor groups 231-234, aggregation panels 221-224 or regional aggregators 242, to transform the sensor data from a native format into a standard format, and to store the sensor data that is transformed into the standard format into one or more of data storage devices 280, e.g., one or more destination data storage systems, which may each comprise one or more servers. To accomplish these tasks, an ingest controller may be configured with a pair of drivers, a source driver for retrieving the sensor data from specified devices, where the sensor data is in a particular vendor format, and a destination driver, for transforming the sensor data into a particular standard format.

In accordance with the present disclosure, the operator of ingest controller(s) 250 and/or the operator of data storage device(s) 280 may publish a standard format in a public schema, where the standard format specifies how sensor data should be formatted for storage in data storage device(s) 280. In response to the published public schema, a BMS vendor may create a source driver that specifies how sensor data may be accessed in the vendor's systems and a destination driver that transforms the sensor data that may be retrieved from the vendor's systems into the standard format according to the published public schema. Thus, each vendor that supplies sensors and aggregation panels may provide a respective set of drivers (e.g., a source/destination driver pair).

Notably, there may be different published public schemas with different standard data formats for destination data storage devices 280. For instance, the ingest controller(s) 250 may be operated by an entity as a service to multiple BMS data consumers, each of which may have different data format preferences. Thus, vendors may provide different destination drivers to accommodate a plurality of different standard data formats. In some instances, a different source driver may also be provided that is specifically for use in connection with different standard data formats for different destinations. However, in other instances, the same source driver may be utilized for access to a vendor's sensor data, regardless of the standard data format of the destination. In one example, each of the drivers that may be provided by the one or more vendors may be stored in database 260.

In one example, a plurality of ingest controllers 250 may be deployed in a load balancing arrangement. For example, one of the ingest controllers 250 may be designated as a coordinator to distribute assignments to other ingest controllers. In one example, the coordinator ingest controller may also distribute assignments to itself. To illustrate, an operator of buildings 211 and 212 may desire to perform analytics on sensor data from buildings 211 and 212 for any of a number of purposes, such as: energy efficiency auditing, determining optimal thermostat settings, humidistat settings, airflow settings, and so forth. Accordingly, the project may require sensor data from sensor groups 231-234 for a certain time period, e.g., over the course of a week, over the course of a month, etc. Thus, the coordinator ingest controller may assign a particular one of the ingest controllers 250 to retrieve sensor data for sensor groups 231 and 233. For example, sensor groups 231 and 233 may comprise sensors of a first vendor and utilize a data format of the first vendor. Sensor group 231 may provide sensor data to aggregation panel 221, while sensor group 233 may provide sensor data to aggregation panel 223.

The assigned ingest controller 250 may retrieve the appropriate source and destination driver from database 260. Thereafter, using the source driver, the ingest controller 250 may retrieve the sensor data from aggregation panels 221 and 223. For example, the source driver may direct that aggregation panels 221 and 223 be accessed by file exchange, database query/remote query, web service call, etc. In addition, the source driver may specify certain authentication and authorization requirements, port usage, access times, and so forth.

The same or a different ingest controller 250 may be assigned to retrieve sensor data for sensor group 232. For instance, sensor group 232 may be provided by a second vendor and be managed by aggregation panel 222. Thus, the ingest controller 250 assigned to retrieve sensor group 232 data may obtain the source and destination drivers for the second vendor from database 260 and utilize the source driver to obtain sensor data for sensor group 232 from aggregation panel 222. Similarly, the same or a different ingest controller 250 may be assigned to retrieve sensor data for sensor group 234. For instance, sensor group 234 may be provided by a third vendor and be managed by aggregation panel 224. Thus, the ingest controller 250 assigned to retrieve sensor group 234 data may obtain the source and destination drivers for the third vendor from database 260 and utilize the source driver to obtain sensor data for sensor group 234 from aggregation panel 224.

Notably, one or more ingest controllers 250 may thus be accessing sensor data for different vendor's sensors on an ongoing basis. In one example, the sensor data may be stored in one or more intermediate storage devices 270 that may be local to or collocated with the one or more ingest controllers 250. However, regardless of whether the one or more intermediate storage devices 270 are utilized, the ingest controller(s) 250 may then utilize the respective destination drivers to transform or "normalize" the sensor data in the different vendor formats into the standard format, and to store the transformed sensor data into the one or more data storage devices 280.

In one example, two or more of the ingest controllers 250 may be assigned to retrieve sensor data for the same sensor set. For instance, if the volume of sensor data is large and the ingest controllers 250 are tasked with continuously retrieving, translating and storing the sensor data, a single ingest controller 250 may be unable to process the sensor data as fast as it is generated. However, two or more of the ingest controllers 250 may retrieve sensor data with respect to the same sensors in alternating time periods, or in a round-robin fashion, such that all of the desired sensor data may be processed. Having a plurality of ingest controllers 250 also allows for redundancy in the event that one of the ingest controllers 250 becomes unavailable for any reason.

In addition to the foregoing examples, it should be noted that a vendor may also provide a source driver that enables access to a regional aggregator, e.g., one of regional aggregators 241-242. For instance, a source driver may allow only access to a regional aggregator of the vendor's system, or may allow an ingest controller to select between accessing a regional aggregator or an aggregation panel. Similarly, a vendor may also provide a source driver that permits a sensor to be accessed directly. However, insofar as the present disclosure is directed to large sets of sensor data from a large number of sensors throughout potentially many rooms, floors and buildings, it is contemplated that sensor data will primarily be retrieved from aggregation panels and/or from regional aggregators, where available.

Figure 3:
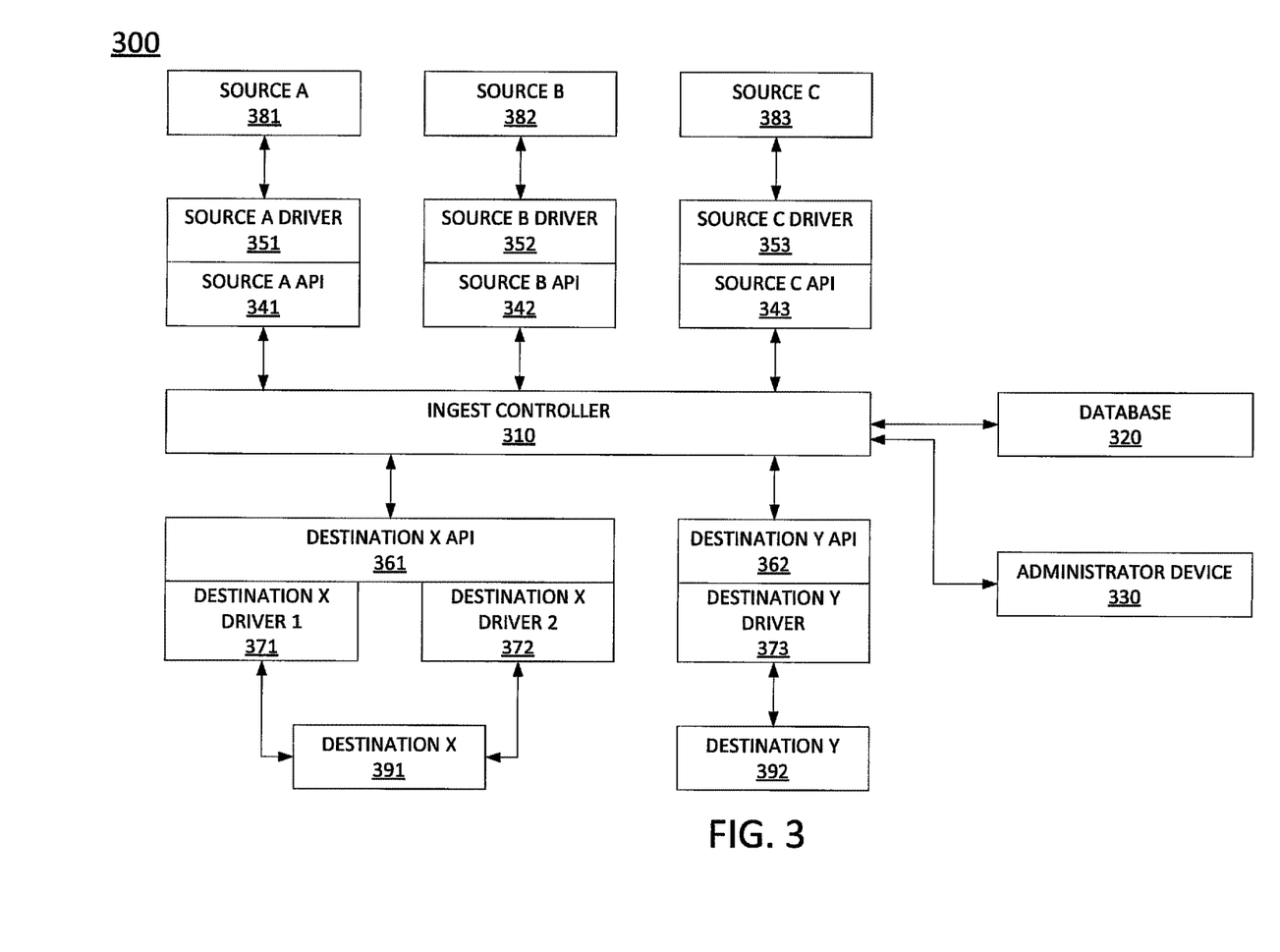
FIG. 3 illustrates an architecture for an ingest controller, according to one example of the present disclosure.

FIG. 3 illustrates a logical architecture for an ingest controller system 300, according to the present disclosure. As illustrated in FIG. 3, the system 300 includes ingest controller 310, database 320 and administrator device 330. In one example, administrator device 330 may be utilized to upload source and destination drivers to database 330 and to present job requests to ingest controller 310.

In the example of FIG. 3, a first job may require sensor data from source A 381 and source B 382 (e.g., respective vendors' building management systems) to be stored in destination X 391 (e.g., a destination data storage system). For this job, ingest controller 310 may retrieve source A driver 351, source B driver 352, destination X driver 1 371 and destination X driver 2 372 from database 320. Each of these drivers may be invoked and utilized by ingest controller 310 via source A application programming interface (API) 341, source B API 372 and destination X API 361 respectively. In this example, destination X driver 1 371 may be for transforming sensor data from source A 381 into a standard data format of destination X 391, while destination X driver 2 372 may be for transforming sensor data from source B 382 into the standard data format of destination X 391.

If the vendor of source A 381 provides multiple options regarding the manner in which sensor data is retrieved from source A 381, the ingest controller 310 may select from among these options via source A API 341. Similarly, if the vendor of source B 382 provides multiple options regarding the manner in which sensor data is retrieved from source B 382, the ingest controller 310 may select from among these options via source B API 342. On the other hand, destination X API 361 may be provided by the operator of destination X 391, where the destination X driver 1 371 and destination X driver 2 372 are simply plug-ins accessible to destination X API 361. Accordingly, the manner in which destination X 391 is accessed for storage is therefore controlled by the operator of destination X 391.

A second job for ingest controller 310 may require sensor data from source C 383 (e.g., a third vendor's building management system) to be stored in destination Y 392. For this job, ingest controller 310 may retrieve source C driver 353 and destination Y driver 373 from database 320. Each of these drivers may be invoked and utilized by ingest controller 310 via source C API 343 and destination Y API 362 respectively. Source C driver 353 and API 343 may provide access to sensor data from source C 383 in the manner that is preferred and specified by the vendor of the building management system (BMS) of source C 383. However, destination Y API 362 may be provided by the operator of destination Y 392, where the destination Y driver 373 is simply a plug-in accessible to destination Y API 362. Thus, the manner in which destination Y 392 is accessed for storage is therefore controlled by the operator of destination Y 392.

Figure 4:
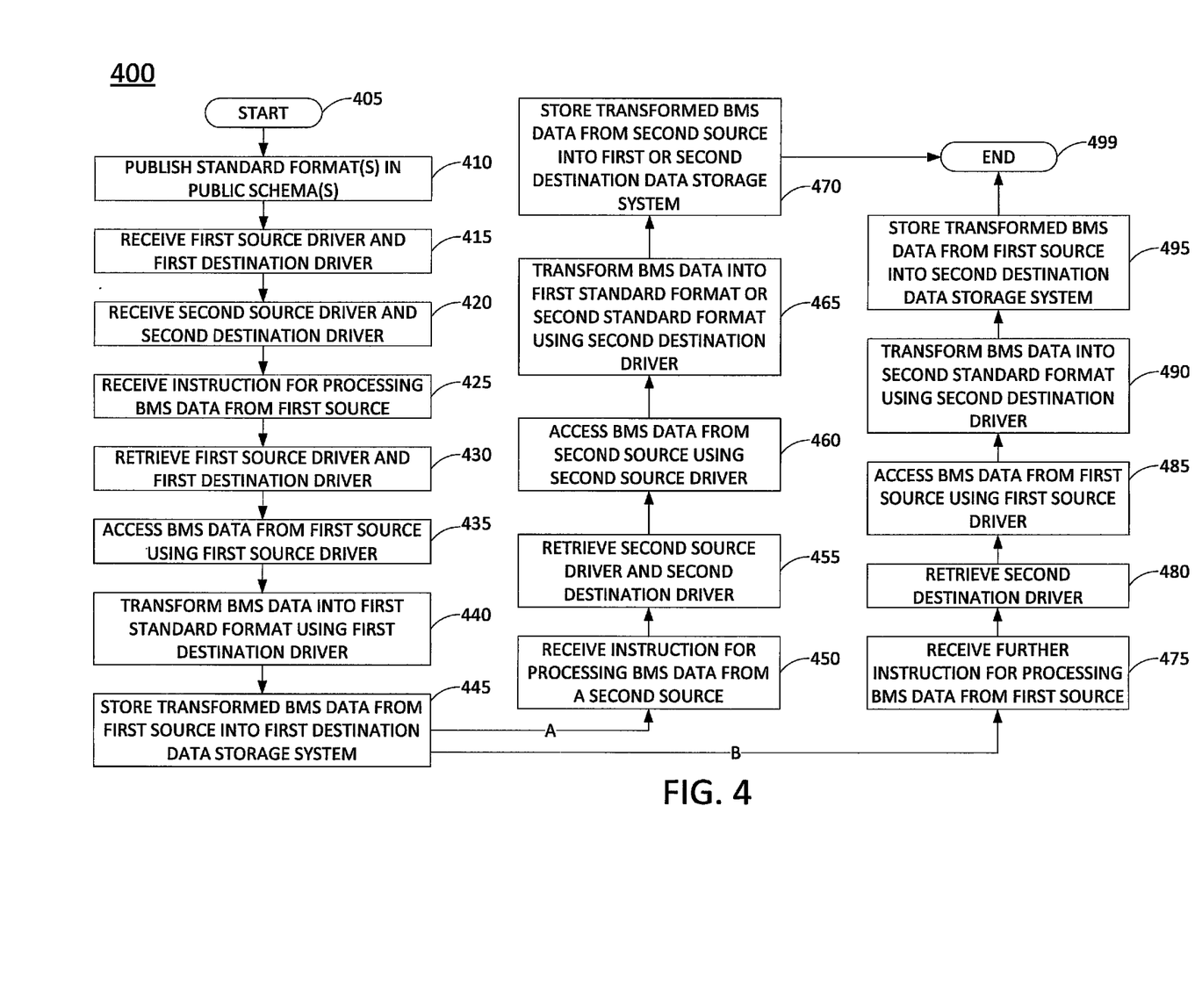
FIG. 4 illustrates a method of the present disclosure for processing building management system data, according to one example of the present disclosure.

FIG. 4 illustrates a flowchart of a method 400 of the present disclosure for processing building management system data. In one embodiment, the method 400 is performed by a ingest controller, or server, such as AS 120 in FIG. 1 or one of ingest controllers 250 or 310 in FIGS. 2 and 3 respectively. Alternatively, or in addition, the steps, functions, or operations of method 400 may be performed by a device or system 500, and/or processor 502 as described in connection with FIG. 5 below, specifically programmed to perform the steps, functions and/or operations of the method. For illustrative purposes, the method will now be described in terms of an embodiment where steps of the method are performed by a processor, such as processor 502 in FIG. 5.

Method 400 starts in step 405 and proceeds to step 410. In step 410, the processor publishes one or more standard formats for receiving sensor data in one or more public schemas. For example, multiple entities having different systems for receiving BMS/sensor data may require the sensor data to be gathered from various sources utilizing different native data formats and to be transformed and stored in a standard format. In other words each entity may have a different standard data format, where different vendors' BMS sensors and other components may supply sensor data to any one of the different receiving systems. Thus, a number of public schemas specifying different standard data formats may be published.

In step 415, the processor receives a first source driver and a first destination driver. For example, a first BMS vendor may generate the first source driver that specifies how sensor data may be retrieved from the first vendor's BMS components, e.g., sensors, aggregation panels, regional aggregators, and other devices within the vendor's system. The first source driver may allow calls and access to the vendor's devices and sensor data in a way that the vendor prefers. For example, the source driver may provide for sensor data to be accessed on an aggregation panel via one or more methods such as file exchange, database queries/remote queries, web service calls, etc. The source driver may also specify other parameters, such as a port to use, and encryption methodology for secure information exchange, and so forth. The first vendor may also generate the first destination driver for transforming sensor data from the vendor's BMS components into a first standard format for a first destination system. In one example, step 410 further comprises storing the first source driver and first destination driver that are received into a database for later access.

In step 420, the processor receives a second source driver and second destination driver. For instance, a second vendor may provide a source driver specifying how sensor data may be retrieved from the second vendor's BMS components and a destination driver for transforming the sensor data from the second vendor's BMS components into a standard format for a destination system. In one example, the standard format may be the first standard format, e.g., the same format associated with the first destination driver and the first destination system. In another example, the standard format may be associated with a second destination system. For instance, the processor may provide a middleware service for obtaining sensor data from diverse sources, transforming the sensor data into one of a plurality of standard formats, and storing the transformed sensor data into one of a plurality of destination data storage systems. Notably, the plurality of destination data storage systems may be associated with different data consuming entities, or may be associated with a single entity that desires to have BMS/sensor data in different standard formats. In one example, step 420 further comprises storing the second source driver and second destination driver that are received into a database for later access.

At step 425, the processor receives an instruction for processing BMS data from the first source. For example, a coordinator ingest controller device may send an instruction to the processor to retrieve BMS data from the first source, to transform the BMS data into a standard format for the first destination and to store the transformed BMS data into the first destination data storage system. For instance, the processor may be a processor of one of a plurality of ingest controllers, where another one of the plurality of ingest controllers comprises a coordinator device for load balancing and task assignments among the other ingest controllers. However, in another example, the processor may exist in an ingest controller where there is not an external coordinator. Thus, the processor may simply receive the instruction directly, e.g., from an administrator device.

At step 430, the processor retrieves the first source driver and the first destination driver. In one example, the first source driver and the first destination driver may have been stored in a database at step 410. Thus, the processor may simply retrieve the first source driver and the first destination driver from such database after receiving the instruction at step 425.

At step 435, the processor access BMS data from the first source using the first source driver. As mentioned above, the first source driver may provide for sensor data to be accessed on an aggregation panel via one or more techniques such as file exchange, database queries/remote queries, web service calls, etc. If the first source driver allows the use of different techniques to retrieve the BMS data, an API for the first source may provide for the processor to select from among such options. In addition, the API may also allow the processor to select from different locations from which to retrieve the BMS data, if access to BMS data at different locations is available. For example, sensor data may be retrieved from a data aggregation panel, from the sensors directly, or from a regional aggregator, depending upon the particular configuration of the first source system. Thus, in one example, at step 435 the processor may also select from among available access options.

At step 440, the processor transforms the BMS data into the first standard format using the first destination driver. For instance, the BMS data may be normalized as defined by the published public schema for the first destination data storage system, e.g., by standardizing temperature from Celsius (C) and Fahrenheit (F) into kelvin (K), standardizing pressure into mmHg, Bar, Torr, pascals (Pa), atmospheres (atm), and so forth. Notably, while the standard format is defined for the destination data storage system, the transformation is performed via the driver that is created by the vendor of the first source. In particular, the vendor of the first source is best situated to be aware of the source BMS data format, while also having knowledge of the standard format into which the source BMS data should be transformed by way of the published public schema of the destination data storage system.

In one example, step 440 may comprise normalizing the BMS data from the first source into a first standardized time format of the first standard format. For example, the first standard format may specify a first standardized time format of 10 second intervals, one minute intervals, 10 minute intervals, and so forth. On the other hand, the source BMS data format(s) may comprise sensor data that is generated by a particular class of sensor devices sampling once every 5 seconds, or a sensor may provide a 30 minute average reading every 30 minutes, and so forth. Thus, for example, if a sensor provides a 30 minute average reading of some environmental parameter, and the first standardized time format calls for 10 second intervals, since there are 180 ten-second intervals in 30 minutes, the same 30 minute average reading of the environmental parameter may be utilized for each ten-second data point in the destination data set.

At step 445, the processor stores the transformed BMS data from the first source into the first destination data storage system. In one example, the processor uses an API defined by the operator of the destination data storage system, which may be the same entity that is operating the ingest controller in which the processor resides, or a different entity. As such, the API for the destination data storage system regulates the way in which the destination data storage system is accessed for purposes of storing the BMS data. Following step 445, the processor may proceeds to one of step 450 (branch A) or step 475 (branch B).

With respect to branch A, at step 450, the processor may receive an instruction for processing BMS data from a second source. In one example, the instruction is received from a coordinator ingest controller. In another example, the instruction is received from an administrator device. In one example, the instruction may comprise an instruction to retrieve BMS data from the second source, to transform the BMS data into the standard format for the first destination data storage system and to store the transformed BMS data into the first destination data storage system. However, in another example, the instruction may comprise an instruction to retrieve BMS data from the second source, to transform the BMS data into a standard format for a second destination data storage system and to store the transformed BMS data into the second destination data storage system.

At step 455, the processor retrieves the second source driver and the second destination driver. For example, the second source driver and the second destination driver may be provided by a vendor of a second source building management system in response to a published public schema for the first destination data storage system or the second destination data storage system. The second source driver and the second destination driver may therefore be stored in a database and retrieved by the processor at step 455 in response to the instruction received at step 450.

At step 460, the processor accesses BMS data from the second source using the second source driver. For example, operations of step 460 may comprise similar operations to those described above in connection with step 435. The second source may comprise sensors or a data aggregation panel providing data with respect to the same physical parameters as the first source, or different physical parameters. However, in any case the second source may utilize a different data format from the data format of the first source.

In step 465, the processor transforms the BMS data from the second source into the first standard format or the second standard format utilizing the second destination driver, e.g., depending upon the instruction received at step 450 and the second destination driver retrieved at step 455. In one example, step 465 may comprise similar operations to those described above in connection with step 440.

In step 470, the processor stores the transformed BMS data from the second source into the first destination data storage system or the second destination data storage system, e.g., depending upon the instruction received at step 450.

Following step 470, the method 400 proceeds to step 499 where the method ends.

Continuing the discussion of the method 400 with respect to branch B, at step 475, the processor may receive a further instruction for processing BMS data from the first source. For example, the instruction may direct the processor to transform the BMS data from the first source into a standard format for a second destination data storage system and to store the transformed BMS data into the second destination data storage system. In one example, the instruction is received from a coordinator ingest controller. In another example, the instruction is received from an administrator device.

At step 480, the processor retrieves a second destination driver in response to the instruction received at step 475. For example, the second destination driver may be provided by a vendor of the first source building management system in response to a published public schema for the second destination data storage system. The second destination driver may therefore be stored in a database and retrieved by the processor at step 480 in response to the instruction received at step 475.

At step 485, the processor accesses BMS data from the first source using the first source driver. In one example, the processor is already in possession of the processor, having retrieved the first source driver at step 430. Accordingly, step 480 may comprises the same or similar operations to those described above in connection with step 435. However, in another example, step 485 may relate to the same BMS data that was previously retrieved at step 435. For instance, the processor may store the BMS data retrieved at step 435 in an intermediate data storage device, which may then be accessed by the processor in connection with step 485.

At step 490, the processor transforms the BMS data from the first source into the second standard format using the second destination driver. For example, step 490 may comprise similar operations to those described above in connection with steps 440 and 465.

At step 495, the processor stores the BMS data from the first source that has been transformed into the second standard format into a second destination data storage system. Step 495 may comprise similar operations to those described above in connection with steps 445 and 470. In one example, the second destination data storage system and the first destination data storage system may partially or fully share physical resources. For example, both destination data storage systems may be cloud-based mass-storage platforms that may comprise one or more virtual machines instantiated on the same set of one or more physical devices. Thus, in another example, the first and second destination data storage systems may comprise separate physical resources, and may reside in entirely different physical locations.

Following step 495, the method 400 proceeds to step 499 where the method ends.

In addition, although not specifically specified, one or more steps, functions or operations of method 400 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 4 that recite a determining operation or involve a decision do not necessarily require that both branches of the determining operation be practiced. In other words, one of the branches of the determining operation can be deemed as an optional step. Moreover, steps, blocks, functions or operations of the above described method 400 can be combined, separated, and/or performed in a different order from that described above, without departing from the example embodiments of the present disclosure.

As such, the present disclosure provides at least one advancement in the technical field of building management systems (BMS). In particular, in one example, the present disclosure requires that each vendor provides a driver for its respective data aggregation platform to allow an ingest controller to access and retrieve the sensor data from the data aggregation platform. In one example, the vendor is also required to provide the driver such that the sensor data that is retrieved is transformed into a preferred format for the receiving platform. Thus, execution of the driver by the ingest controller will cause the ingest controller to access the sensor data in its native format from the vendor's data aggregation platform, retrieve the sensor data, manipulate the sensor data into a preferred common format, and store the sensor data to the destination data storage system. Advantageously, this allows each vendor to specify how data will be accessed on its data aggregation platform and to thereby retain control over its own product. In addition, the data consumer is also able to aggregate sensor data from diverse sources and store normalized sensor data in a useful standard format.

The present disclosure also provides a transformation of data. For example, sensor data is generated by different vendors' BMS systems in different native formats, transformed into a standard format that is used by a destination data storage system, and then stored in the destination data storage system, where the native data formats are different from the standard format that is utilized by the destination data storage system.

Finally, embodiments of the present disclosure improve the functioning of a computing device, e.g., a server. Namely, a new type of server for processing building management system data, e.g., an ingest controller, accesses sensor data in a native format from the vendor's data aggregation platform, retrieves the sensor data, manipulates the sensor data into a preferred common format, and stores the data to the destination data storage system. Notably, no previous server has performed these functions as described herein. For example, previous devices or servers are simply able to copy sensor data from a vendor's BMS and store the sensor data in a centralized location with sensor data from other sources and in different formats.

Figure 5:
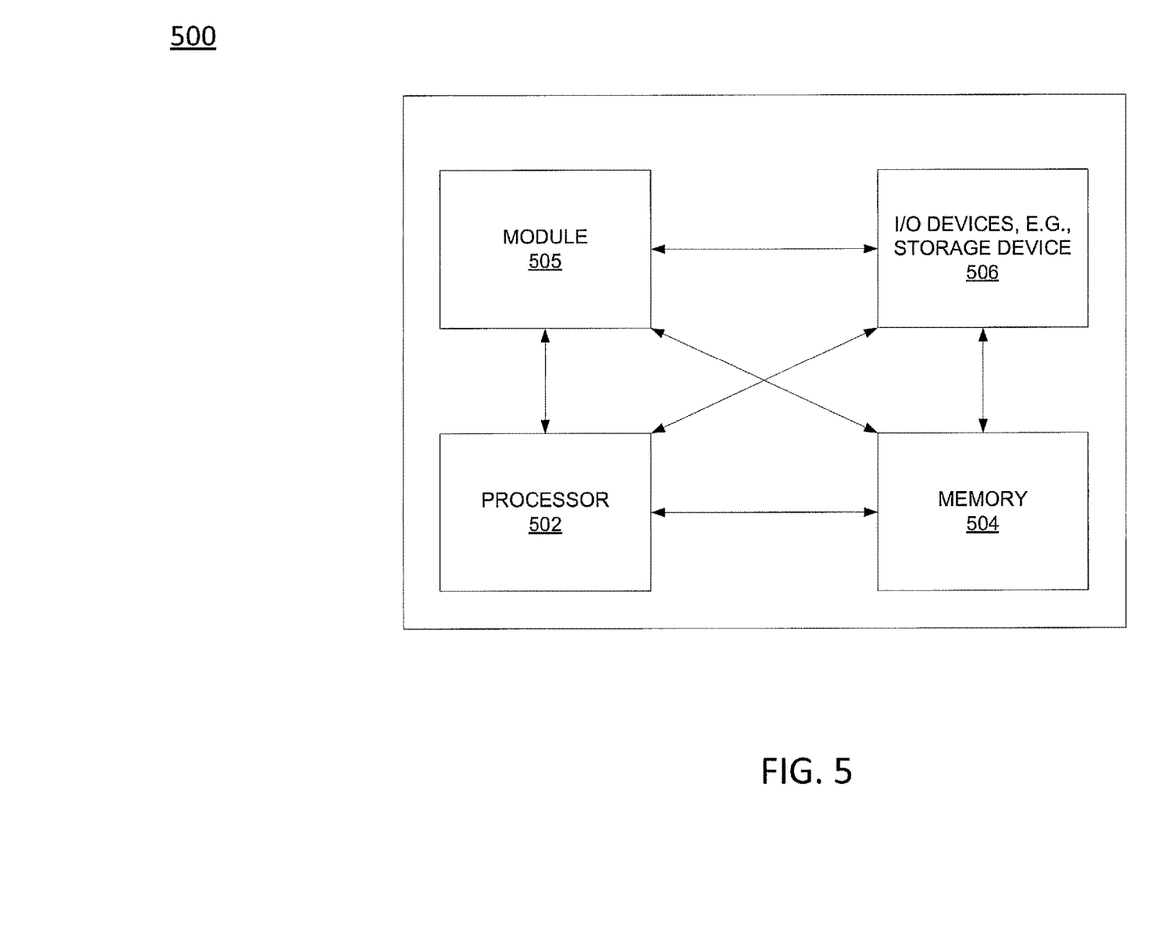
FIG. 5 illustrates a high-level block diagram of a computer suitable for use in performing the functions, methods and algorithms described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for processing building management system data, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 502 can also be configured or programmed to cause other devices to perform one or more operations as discussed above. In other words, the one or more hardware processors 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 505 for processing building management system data (e.g., a software program comprising computer-executable instructions) can be loaded into memory 504 and executed by hardware processor element 502 to implement the steps, functions or operations as discussed above in connection with the illustrative method 400. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for processing building management system data (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device for processing building management system data, the device comprising:
   at least one processor; and
   a computer-readable medium storing instructions which, when executed by the at least one processor, cause the at least one processor to perform operations, the operations comprising:
      retrieving a first source driver and a first destination driver, wherein the first source driver is for accessing the building management system data in a first data storage format from a first source, wherein the first source comprises a first building management system aggregation panel for aggregating the building management system data from a first plurality of sensors of a building, wherein the first source driver is received from a first vendor of the first source, wherein the first destination driver is for transforming the building management system data in the first data storage format from the first source into a first standard data storage format utilized by a first destination data storage system;

accessing the building management system data in the first data storage format from the first source using the first source driver via a communication system;

transforming the building management system data in the first data storage format from the first source into the first standard data storage format using the first destination driver;

storing the building management system data from the first source that is transformed into the first standard data storage format into the first destination data storage system;

retrieving a second source driver and a second destination driver, wherein the second source driver is for accessing the building management system data in a second data storage format from a second source, wherein the second source comprises a second building management system aggregation panel for aggregating the building management system data from a second plurality of sensors of the building, wherein the second source driver is received from a second vendor of the second source, wherein the second destination driver is for transforming the building management system data in the second data storage format from the second source into the first standard data storage format utilized by the first destination data storage system;

accessing the building management system data in the second data storage format from the second source using the second source driver via the communication system;

transforming the building management system data in the second data storage format from the second source into the first standard data storage format using the second destination driver;

storing the building management system data from the second source that is transformed into the first standard data storage format into the first destination data storage system; and utilizing the building management system data of both the first source and the second source stored in the first destination data storage system using the first standard data storage format to monitor or control at least one physical parameter relating to the building, wherein the at least one physical parameter comprises: a temperature, a humidity, an atmospheric pressure, a light level, a sound level, or an air quality.

2. The device of claim 1, wherein the operations further comprise:
receiving an instruction for processing the building management system data in the first data storage format from the first source, wherein the instruction includes an identifier of the first source driver and an identifier of the first destination driver.

3. The device of claim 2, wherein the device comprises one of a plurality of middleware servers for processing the building management system data, wherein the instruction is received from a load balancer server.

4. The device of claim 1, wherein the first destination data storage system is one of a plurality of destination data storage systems, wherein each of the plurality of destination data storage systems utilizes a different one of a plurality of standard data storage formats, wherein the first standard data storage format utilized by the first destination data storage system comprises one of the plurality of standard data storage formats.

5. The device of claim 1, wherein the operations further comprise:
publishing the first standard data storage format in a public schema, wherein the first source driver and the first destination driver are received in response to the publishing the first standard data storage format.

6. The device of claim 1, wherein the building management system data from the first plurality of sensors in the first data storage format is in a first vendor data storage format of the first vendor that is different from the first standard data storage format.

7. The device of claim 1, wherein the operations further comprise:
receiving an instruction for processing the building management system data in the second data storage format from the second source, wherein the instruction includes an identifier of the second source driver and an identifier of the second destination driver.

8. The device of claim 1, wherein the building management system data from the first plurality of sensors in the first data storage format is in a first vendor data storage format of the first vendor that is different from the first standard data storage format, and wherein the building management system data from the second plurality of sensors in the second data storage format is in a second vendor data storage format of the second vendor that is different from the first vendor data storage format and different from the first standard data storage format.

9. The device of claim 1, wherein the operations further comprise:
receiving an instruction for processing the building management system data in the second data storage format from the second source, wherein the instruction includes an identifier of the second source driver and an identifier of a third destination driver, wherein the third destination driver is for transforming the building management system data in the second data storage format from the second source into a second standard data storage format utilized by a second destination data storage system.

10. The device of claim 9, wherein the operations further comprise:
accessing the building management system data in the second data storage format from the second source using the second source driver;
transforming the building management system data in the second data storage format from the second source into the second standard data storage format using the third destination driver; and
storing the building management system data from the second source that is transformed into the second standard data storage format into the second destination data storage system.

11. The device of claim 1, wherein the operations further comprise:
receiving a further instruction for processing the building management system data from the first source, wherein the further instruction includes an identifier of a third destination driver, wherein the third destination driver is for transforming the building management system data in the first data storage format from the first source into a second standard data storage format utilized by a second destination data storage system.

12. The device of claim 11, wherein the operations further comprise:
    transforming the building management system data in the first data storage format from the first source into the second standard data storage format using the third destination driver; and
    storing the building management system data from the first source that is transformed into the second standard data storage format into the second destination data storage system.

13. The device of claim 1, wherein the transforming the building management system data in the first data storage format from the first source into the first standard data storage format further comprises normalizing the building management system data from the first source into a first standardized time format.

14. The device of claim 1, wherein the building management system data from the first source comprises at least one of:
    temperature data;
    humidity data;
    atmospheric pressure data;
    light level data;
    sound level data; or
    air quality data.

15. A computer-readable medium storing instructions which, when executed by at least one processor, cause the at least one processor to perform operations for processing building management system data, the operations comprising:
    retrieving a first source driver and a first destination driver, wherein the first source driver is for accessing the building management system data in a first data storage format from a first source, wherein the first source comprises a first building management system aggregation panel for aggregating the building management system data from a first plurality of sensors of a building, wherein the first source driver is received from a first vendor of the first source, wherein the first destination driver is for transforming the building management system data in the first data storage format from the first source into a first standard data storage format utilized by a first destination data storage system;
    accessing the building management system data in the first data storage format from the first source using the first source driver via a communication network;
    transforming the building management system data in the first data storage format from the first source into the first standard data storage format using the first destination driver;
    storing the building management system data from the first source that is transformed into the first standard data storage format into the first destination data storage system;
    retrieving a second source driver and a second destination driver, wherein the second source driver is for accessing the building management system data in a second data storage format from a second source, wherein the second source comprises a second building management system aggregation panel for aggregating the building management system data from a second plurality of sensors of the building, wherein the second source driver is received from a second vendor of the second source, wherein the second destination driver is for transforming the building management system data in the second data storage format from the second source into the first standard data storage format utilized by the first destination data storage system;
    accessing the building management system data in the second data storage format from the second source using the second source driver via the communication network;
    transforming the building management system data in the second data storage format from the second source into the first standard data storage format using the second destination driver;
    storing the building management system data from the second source that is transformed into the first standard data storage format into the first destination data storage system; and
    utilizing the building management system data of both the first source and the second source stored in the first destination data storage system using the first standard data storage format to monitor or control at least one physical parameter relating to the building, wherein the at least one physical parameter comprises: a temperature, a humidity, an atmospheric pressure, a light level, a sound level, or an air quality.

16. A method for processing building management system data, the method comprising:
    retrieving, by at least one processor, a first source driver and a first destination driver, wherein the first source driver is for accessing the building management system data in a first data storage format from a first source, wherein the first source comprises a first building management system aggregation panel for aggregating the building management system data from a first plurality of sensors of a building, wherein the first source driver is received from a first vendor of the first source, wherein the first destination driver is for transforming the building management system data in the first data storage format from the first source into a first standard data storage format utilized by a first destination data storage system;
    accessing, by the at least one processor, the building management system data in the first data storage format from the first source using the first source driver via a communication network;
    transforming, by the at least one processor, the building management system data in the first data storage format from the first source into the first standard data storage format using the first destination driver;
    storing, by the at least one processor, the building management system data from the first source that is transformed into the first standard data storage format into the first destination data storage system;
    retrieving, by the at least one processor, a second source driver and a second destination driver, wherein the second source driver is for accessing the building management system data in a second data storage format from a second source, wherein the second source comprises a second building management system aggregation panel for aggregating the building management system data from a second plurality of sensors of the building, wherein the second source driver is received from a second vendor of the second source, wherein the second destination driver is for transforming the building management system data in the second data storage format from the second source into the first standard data storage format utilized by the first destination data storage system;

accessing, by the at least one processor, the building management system data in the second data storage format from the second source using the second source driver via the communication network;

transforming, by the at least one processor, the building management system data in the second data storage format from the second source into the first standard data storage format using the second destination driver;

storing, by the at least one processor, the building management system data from the second source that is transformed into the first standard data storage format into the first destination data storage system; and utilizing, by the at least one processor, the building management system data of both the first source and the second source stored in the first destination data storage system using the first standard data storage format to monitor or control at least one physical parameter relating to the building, wherein the at least one physical parameter comprises: a temperature, a humidity, an atmospheric pressure, a light level, a sound level, or an air quality.

17. The method of claim 16, further comprising:
receiving, by the at least one processor, an instruction for processing the building management system data in the first data storage format from the first source, wherein the instruction includes an identifier of the first source driver and an identifier of the first destination driver.

18. The method of claim 16, further comprising:
publishing the first standard data storage format in a public schema, wherein the first source driver and the first destination driver are received in response to the publishing the first standard data storage format.

19. The method of claim 17, wherein the at least one processor is a component of at least one of a plurality of middleware servers for processing the building management system data, wherein the instruction is received from a load balancer server.

20. The method of claim 16, wherein the first destination data storage system is one of a plurality of destination data storage systems, wherein each of the plurality of destination data storage systems utilizes a different one of a plurality of standard data storage formats, wherein the first standard data storage format utilized by the first destination data storage system comprises one of the plurality of standard data storage formats.

* * * * *